United States Patent
Chatigny et al.

(10) Patent No.: US 6,979,264 B2
(45) Date of Patent: Dec. 27, 2005

(54) METHOD AND SYSTEM FOR VERIFYING ENTITLEMENT TO PLAY A GAME USING BIOMETRIC IDENTIFIER

(75) Inventors: Michelle Chatigny, Las Vegas, NV (US); Rick Rowe, Henderson, NV (US)

(73) Assignee: IGT, Reno, NV (US)

( * ) Notice: Subject to any disclaimer, the term of this patent is extended or adjusted under 35 U.S.C. 154(b) by 237 days.

(21) Appl. No.: 10/244,156

(22) Filed: Sep. 12, 2002

(65) Prior Publication Data

US 2004/0053692 A1 Mar. 18, 2004

(51) Int. Cl.[7] ............................. A63F 9/24; G06K 9/00; G06F 17/00; H04L 9/00
(52) U.S. Cl. .......................... 463/29; 463/25; 463/42; 340/323 R; 340/5.52; 340/5.82; 713/186; 713/201; 902/3; 902/23
(58) Field of Search ...................... 463/1, 9–13, 16–20, 463/25–27, 29–30, 36, 40–43; 273/292–293, 273/236–237, 143 R; 700/91–96; 340/323 R, 340/5.8, 5.81, 5.82, 5.83; 902/23, 1, 3; 235/375, 235/380–382; 713/182–186; 382/115, 116, 382/118, 124

(56) References Cited

U.S. PATENT DOCUMENTS

| | | | |
|---|---|---|---|
| 5,755,621 A * | 5/1998 | Marks et al. ................. | 463/42 |
| 5,768,382 A | 6/1998 | Schneier et al. | |
| 5,991,431 A * | 11/1999 | Borza et al. ................. | 382/127 |
| 6,039,648 A * | 3/2000 | Guinn et al. .................. | 463/16 |
| 6,142,876 A | 11/2000 | Cumbers | |
| 6,178,510 B1 | 1/2001 | Connor et al. | |
| 6,508,709 B1 * | 1/2003 | Karmarkar .................... | 463/42 |
| 6,612,928 B1 | 9/2003 | Bradford et al. | |
| 6,709,333 B1 | 3/2004 | Bradford et al. | |
| 2003/0108227 A1 | 6/2003 | Philomin et al. | |

OTHER PUBLICATIONS

International Search Report for related PCT application PCT/US03/27136 dated Mar. 15, 2004.

* cited by examiner

Primary Examiner—Mark Sager
(74) Attorney, Agent, or Firm—Marshall, Gerstein & Borun LLP

(57) ABSTRACT

A player is permitted to participate in an interactive gaming event from a remote location, such as a hotel room or home computer, once the player's entitlement to participate has been confirmed using a biometric identifier. One method of the invention includes first verifying the identity of a potential player of a gaming event, such as by verifying the age of the player. If verified, the fingerprint of the player is obtained and the fingerprint is stored in association with an assigned identification code. When a player requests to participate in a gaming event from a remote location, the player's identification code is received from the player and is used to locate the corresponding stored fingerprint. The player then transmits their scanned fingerprint. If the transmitted fingerprint and stored fingerprint match, the player is verified as entitled to participate in the gaming event.

14 Claims, 2 Drawing Sheets

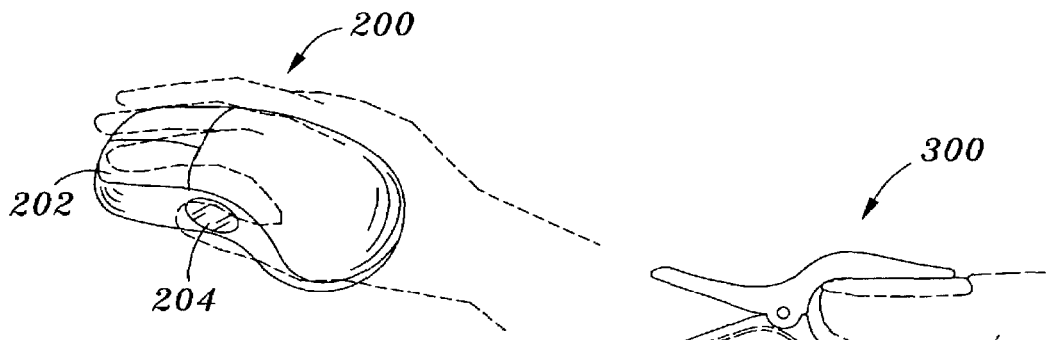
FIG. 3
FIG. 4
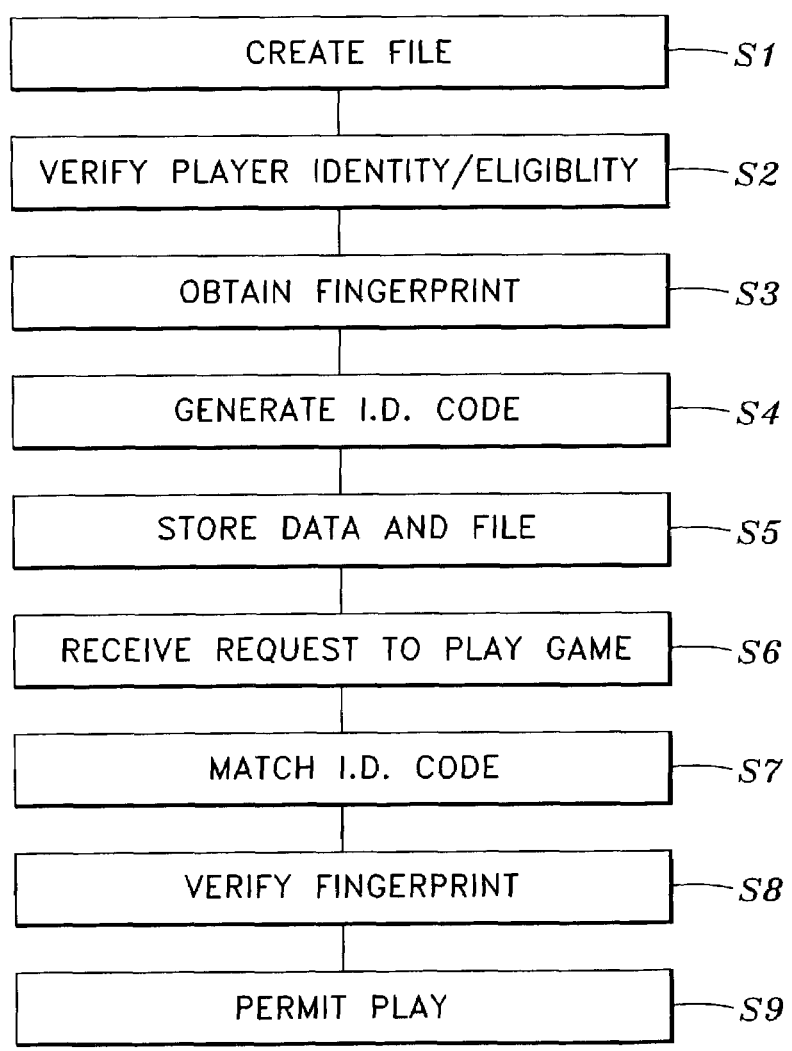
FIG. 5

METHOD AND SYSTEM FOR VERIFYING ENTITLEMENT TO PLAY A GAME USING BIOMETRIC IDENTIFIER

FIELD OF THE INVENTION

The present invention relates to methods for verifying the identity of a player of a game.

BACKGROUND OF THE INVENTION

Interactive gaming continues to grow despite obstacles to its implementation and regulatory approval. Interactive gaming currently exists in several forms. One form of interactive gaming is "on-line" gaming. Numerous gaming operators operate websites which permit players to engage in gaming activities such as betting and playing wager-type games. These gaming operators generally operate servers from locations where on-line gaming is legal. Because of the world-wide access to such websites via the Internet, players of these games may, however, be located in a jurisdiction where gaming is illegal.

Another form of interactive gaming is closed network gaming, such as "in-room" gaming. Many casinos are considering implementing or have implemented gaming systems which permit patrons to engage in gaming activities from their rooms.

Gaming, especially in the United States, is a highly regulated industry. Many rules and regulations govern aspects of gaming. These rules and regulations have been implemented for a variety of reasons, including to address general social or societal concerns, and to protect the players. For example, laws exist which govern the approval of games and gaming machines, and which set the minimum age of a player.

These rules and regulations were directed at land-based casinos. With respect to an age limitation, for example, security personnel at a casino may observe the player to ensure that they are of sufficient age to play the game. If necessary, the personnel can check the player's identification to verify their age.

A number of problems have emerged with the advent of interactive gaming. First, gaming is now accessible to players who are located in jurisdictions where gaming is not legal. Second, even where gaming is legal, regulators are concerned about ensuring that rules and regulations address societal concerns and protect players, and that these rules and regulations can be enforced. As a result, regulators are currently considering the various impacts of interactive gaming and considering various rules and regulations specifically directed to interactive gaming and how to enforce those rules and regulations.

One particular concern of regulators is ensuring that a player is entitled to play a game. For example, regulators wish to ensure that a player is of sufficient age to play the game. This means that entitlement of a player to play a game must be verified. Several means have been proposed for identifying a player, such as by use of an identification code which is issued to a player whose identity is confirmed. The player may use the identification code at a later time to identify themselves.

A significant concern of regulators, however, is the probability that such systems of verification may be thwarted or tricked. For example, one player may log on to a gaming system and then permit another player to play. A minor child may learn his parent's access code and engage in in-room game play.

A method and system for identifying a player and ensuring that only an authorized player is permitted to play and is playing a game is desired.

SUMMARY OF THE INVENTION

The present invention is a method of verifying entitlement of a player to play a game. In one embodiment, the method is implemented in a system which permits a player to participate in a gaming event, such as a wagering game or other betting event, from a remote location.

In one embodiment, a method of identifying a player for determining entitlement of that player to participate in a gaming event includes the step of verifying the identity of a potential player of a gaming event. In one embodiment, the verifying step includes verifying that the potential player is of sufficient age to participate in a gaming event. The method includes the steps of obtaining a fingerprint of the potential player, generating an identification code, associating the identification code with the fingerprint and storing the fingerprint and identification code.

When a request is received from the player to participate in a gaming event, the player provides their assigned identification code. The identification code is used to locate a corresponding stored fingerprint. The player then provides their fingerprint and that fingerprint is compared to the stored fingerprint. If the fingerprint accepted from the player and the stored fingerprint match, the player is verified as entitled to participate in the gaming event.

In the preferred embodiment, the player's fingerprint is scanned at the time the player wishes to play a game, and the scanned fingerprint information is transmitted and compared to the stored fingerprint information. In one embodiment, the method includes the steps of presenting a gaming event and accepting the fingerprint from the player at one or more times during the gaming event, comparing the fingerprint with the stored fingerprint and permitting continued participation in the gaming event if the accepted fingerprint and the stored fingerprint match. In another embodiment, the player's fingerprint is continuously scanned and transmitted for comparison to the stored fingerprint.

In one embodiment, the method includes the step of creating a database of stored fingerprints of unauthorized players and comparing a scanned fingerprint of a player with the stored fingerprints of unauthorized players and preventing partcipation in the gaming event if the scanned fingerprint and one of the stored fingerprints of the unauthorized players match.

In one embodiment, the method may be implemented in a casino environment. The environment includes a game server and a database. Remote game stations are linked to the server. The game stations may comprise, for example, televisions located in rooms of the casino.

When a player checks in to the hotel, the player's fingerprint is scanned and identification code is issued. The remote game station includes a fingerprint scanner. When a player requests to play a game from the room, the player's fingerprint is scanned and the information is transmitted to the server. The server compares the scanned fingerprint with the player's fingerprint information stored in the database.

In another embodiment, the system may be a game system including a player's home computer, a game kiosk or the like. In this embodiment, the player's computer may be linked to a game server by a telephone link, the Internet or the like. Once again, the player's computer is provided with a fingerprint scanner for scanning and providing fingerprint information.

In one embodiment, the fingerprint scanner comprises a fingerprint scanning pad. In other embodiments, the fingerprint scanner can be clipped or attached to a finger of a player. In yet another embodiment, the fingerprint scanner is associated with an input device, such as a computer mouse.

In accordance with the invention a player's identity and entitlement to participate in a gaming event are determined using a biometric identifier. The method and system prevents a player from switching places with or posing as an authorized player.

Further objects, features, and advantages of the present invention over the prior art will become apparent from the detailed description of the drawings which follows, when considered with the attached figures.

DESCRIPTION OF THE DRAWINGS

FIG. 3 illustrates one embodiment of a fingerprint scanning device for use in determining player identity in accordance with the invention;

FIG. 4 illustrates another embodiment of a fingerprint scanning device for use in determining player identity in accordance with the invention; and FIG. 5 is a flowchart illustrating a method of identifying a player in accordance with the present invention.

DETAILED DESCRIPTION OF THE INVENTION

The invention is a method and system for verifying entitlement of a player to play a game. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

In general, the invention is a system and method for verifying that a player is entitled to play a game. In accordance with the invention, the identity of a player is confirmed using a biometric, and more particularly, a fingerprint of the player. The system and method are particularly suited to identifying a player when the player wishes to play a game or participate in an event from a remote location. The system and method may be applied to other environments, however, including that where the player is actually at present where the game or betting event is occurring, such as a casino.

The present invention has applicability to a wide variety of games and other events. The method and apparatus of the invention has particular applicability to "gambling" events, that is, a game or event involving or including a wager. In a preferred embodiment of the invention, such an event preferably results in the player being awarded a reward in the event of a winning outcome. The game or event may thus comprise a video poker game, for example, or sports or other event betting.

Figure 1:
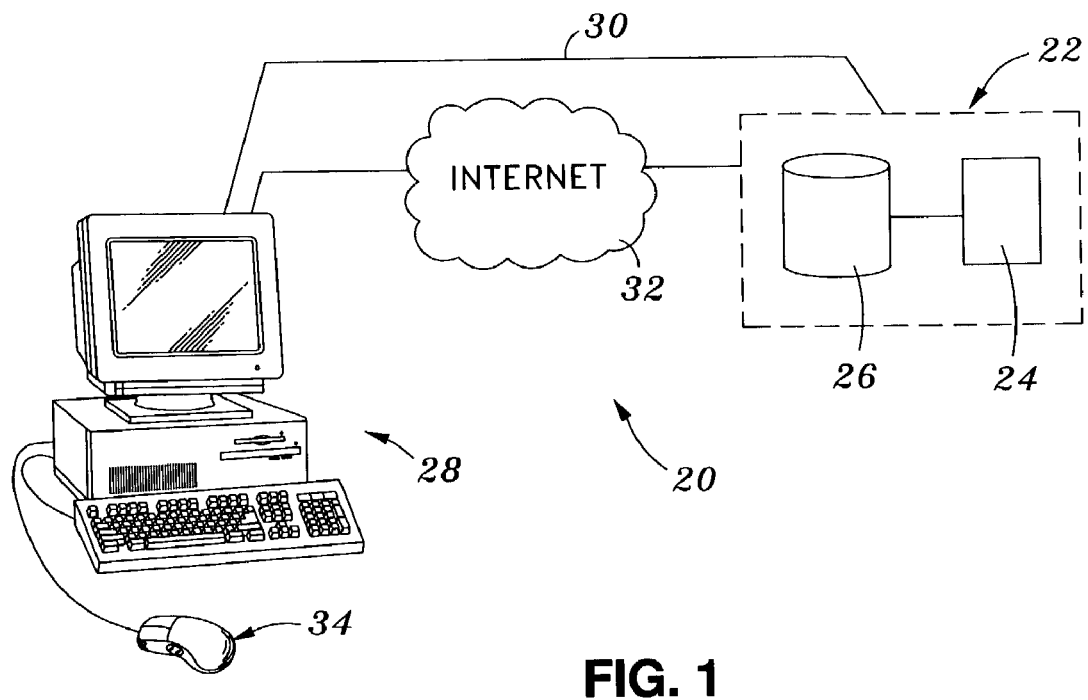
FIG. 1 illustrates a system for verifying the identity of a player in accordance with an embodiment of the invention.

FIG. 1 illustrates one embodiment of a system 20 in accordance with the invention in which a game is presented or a player is permitted to engage in a betting event "on-line." A game or event host 22 presents the game or sponsors a betting event.

In one embodiment, the system 20 includes a game server 24. The game server 24 may comprise a variety of combinations of hardware and/or software. In general, the game server 24 is adapted to facilitate the presentation of or directly present a gaming or gambling event to player who is located remotely.

The game server 24 may comprise a computing device including a processor and a memory. Preferably, the game server 24 includes, or is associated with, a communication interface permitting information to be transmitted to and received from another device. The communication interface may be arranged to implement a wired or wireless communication protocol, such as, for example, a cabled RS-232 or IEEE-1394 (Firewire™) connection/protocol, or a wireless infrared transmitter/receiver or IEEE-802.11(b) (Bluetooth™) connection/protocol.

In one embodiment, the game server 24 may comprise multiple devices. For example, the game server 24 may comprise a data storage device, a communication interface, a processing device and/or other devices connected to one another, such as located on a local area network (LAN).

With respect to the presentation of a gaming event, the game server 24 may be configured in a variety of ways. For example, the game server 24 may be arranged to accept player identification information, accept wager or bet information, accept player game input, generate game event information, determine gaming event outcome, generate winning or award information, and generate or present a wide variety of other events/information.

The types of gaming events which may be presented utilizing the game server 24 may be varied. For example, the game server 24 may be arranged to accept sports or other event bets. The game server 24 may also be arranged to generate video game information, such as video slot or video poker game information. In general, the game server 24 may be arranged to generate game information in a manner similar to a wide variety of known games which are already presented on stand-alone or networked gaming machines.

In a preferred embodiment, the system 20 includes a database 26 or other data storage element. In one embodiment, the database 26 comprises a memory device, such as a semiconductor type memory device (e.g. RAM, EEPROM or other flash memory), magnetic type memory device (e.g. hard drives), or optical type memory device (e.g. CD/DVD), or other data storage devices now known or later developed. The game server 24 is permitted to communicate with the database 26, such as to obtain information from the database, as detailed below.

As illustrated in FIG. 1, the game server 24 is preferably in communication at one or more times with one or more remote player devices/computers 28 via one or more communication links or pathways. In one embodiment, there may be more than one communication link or pathway, and such may be varied. One such communication pathway may be via phone lines 30, such as through local and long-distance telecommunication carriers. Such a pathway may be referred to as a direct connection, in that the end points of the communication pathway remain dedicated to one another during a particular communication session. It will be understood that this pathway may vary depending on a variety of factors, including the mode of data transfer. For example, the pathway may be through land lines, or through wireless links, such as satellite links. The pathway may also include one or more cellular wireless links.

Another communication pathway may be by a global communication network such as the Internet 32. As is known, the Internet is a collection of devices arranged as nodes. Addresses are assigned to the devices, permitting packets of data to be routed through the network from one device to another intended device. In the configuration of the Internet, information is packetized and individual packets of data sent from one device to another may be routed over a variety of pathways through the various nodes of the network.

Of course, other types of communication links may be utilized to transmit information between the devices. These networks may include local area and wide area networks (LANs and WANs).

In general, these communication links are used to enable communication between the game server 24 and a remote player. In one embodiment, the game and other information is presented to the player at their remote computer 28, and the player utilizes the computer 28 to provide inputs. The computer 28 may be a variety of devices including hardware and/or software. In one embodiment, the computer 28 may be a desktop or laptop computer used for a variety of purposes. The computer 28 may also be specially adapted to enable the player to participate in a gaming event. For example, the computer 28 might comprise a specially configured kiosk or station.

In general, the computer 28 may include a processing device, a memory, a display, at least one input device, and at least one communication interface. The processor is preferably arranged to execute program code. The display may comprise a CRT, LED, plasma or other type of device. The input device may comprise a mouse, keyboard and/or other devices, as is well known.

In similar fashion to the game server 24, the computer 28 preferably includes a communication interface permitting information to be transmitted and received. In this regard, the computer 28 preferably includes a communication interface permitting communication via one of the pathways to the game server 24, such as the Internet 32 or phone lines 30. The computer 28 may include a telephone modem or cable modem for this purpose.

In accordance with the invention, the system 20 also includes a biometric identifier or reader 34. Preferably, this biometric identifier or reader 34 is located at the point of game play, such as at the location of the computer 28.

In a preferred embodiment, the biometric identifier comprises a means for reading or otherwise obtaining information regarding a fingerprint. Details regarding this means are provided below.

In general, the biometric identifier 34 is configured to obtain biometric information for use in confirming the identity of the player. In one embodiment, the biometric identifier 34 is connected to or associated with the player's computer 28. Information obtained by the biometric identifier 34 may thus be obtained and transmitted from the player's computer 28 to the game or event host 22.

Various methods in accordance with the invention, including a method of identifying a player using the system 20, are described in more detail below.

Figure 2:
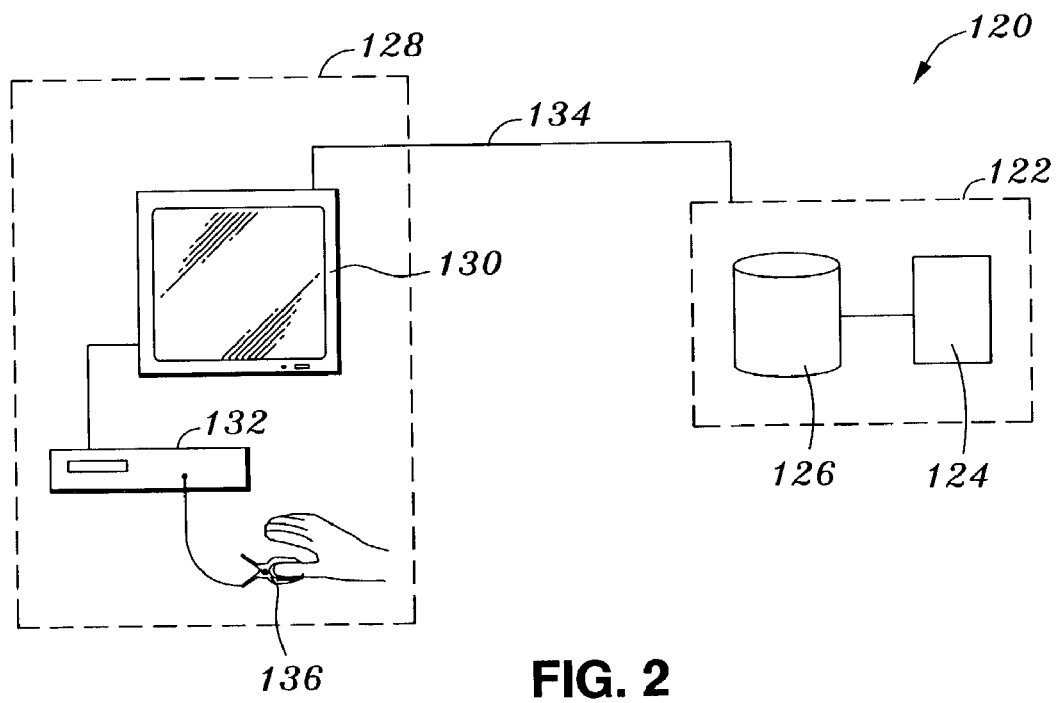
FIG. 2 illustrates another system in accordance with the present invention.

Another system 120 in accordance with the invention in which a game or other event is presented "in-room" is illustrated in FIG. 2. This system 120 is very similar to the system 20 described above and illustrated in FIG. 1. As illustrated, the system 120 again includes a host which presents the game or betting event. In this embodiment, the host is a casino 122 or other entity which provides lodging or specific gaming locations. For example, the host might also comprise a cruise ship operator or the like.

As illustrated, the system 120 includes a game server 124 and a database 126. Once again, the game server 124 is configured to generate and present one or more games or gaming events. The database 126 is configured to store information.

In this embodiment, a game or other better event is presented to a player in their room 128 or at some other designated location. The room 128 may comprise, for example, a room at an associated hotel of the casino.

The system 120 includes means for presenting information to the player in the room 128. As illustrated, this means may comprise a television 130 located in the room 128. In one embodiment, a tuner 132 is provided for selecting particular content to be displayed by the television 130. In other embodiments, instead of a television, a computer or other device may be used, similar to the configuration illustrated in FIG. 1.

A communication link 134 is provided between the room 128 and the casino 122 in like manner to the link between the host 22 and player computer 28 in the system 20 illustrated in FIG. 1. This communication link 134 may be of a variety of types and utilize various protocols. In one embodiment, the link 134 may comprise a cable as part of a television/cable system for routing cable or television feeds to the each in-room television 130. In such event, television signals in NTSC or PAL formats may be provided to the television 130.

The tuner 132 is preferably provided to permit the player to select among various content, such as various television channels. In one embodiment, one or more channels are used to present games or gaming events to a player, as well as execute the method of the present invention.

Like the system 20 illustrated in FIG. 1, this embodiment system 120 includes a biometric identifier or reader 136. As with the previous embodiment, the biometric identifier 136 is used to obtain biometric information for use by the casino 122. As described below, the reader 136 is preferably configured to output data which may be transmitted to the server 124.

The system 120 may also include other input devices. For example, the system 120 may include a keypad, mouse, joystick other device or devices which the player may utilize in their room to provide player input.

Various methods of using this system 120 are described in greater detail below.

The biometric identifier which forms a part of the systems and which is used in the methods of the invention may have a variety of forms. As indicated, in a preferred embodiment, the biometric identifier is a device configured to obtain fingerprint information.

Preferably, the biometric identifier comprises a fingerprint scanner. The scanner may have a variety of forms and operate using a variety of principles. In one embodiment, the scanner is an optical type scanner. Other types of fingerprint scanners now know or later developed may be used, such as CMOS and ultrasonic type scanners.

The scanner may have a variety of configurations. For example, the scanner may be of the common "pad" type in which a user presses their finger against a generally flat scanning surface, such as a glass panel.

FIG. 3 illustrates one embodiment of a fingerprint scanner 200 in accordance with the invention. This embodiment scanner 200 is particularly useful when used as the biometric identifier of a system 20 such as that illustrated in FIG. 1 where the player uses a computer. As illustrated, the scanner 200 is integrated into a computer mouse 202. The mouse 202 may be of a variety of types, including wired and wireless, optical and track-ball.

In the embodiment illustrated, a scanning surface 204 is located on a surface of the mouse 202. As illustrated, the scanning surface 204 is preferably located on a surface which the user normally grips with their thumb T. Thus, when a user places their hand on the mouse 202, their thumb T rests upon the scanning surface 204.

Though not illustrated, a fingerprint scanner is integrated into the mouse 202. For example, an optical scanner may be integrated into the mouse 202 and be configured to scan the print of a player's thumb placed on the scanner surface 204.

Other configurations of scanners 200 may be utilized. For example, more than one scanning surface may be provided, and the location may vary. For example, the scanning surface may be located to scan a player's index finger and be part of a mouse button.

The scanning surface may comprise a glass window or other transparent or substantially transparent member. In one embodiment, the mouse may include a housing which is constructed of a substantially transparent material through which a fingerprint may be scanned.

A fingerprint scanner may be integrated into other input devices, such as a keyboard, joystick or the like. In this manner, when the player uses the input device, their fingerprint may simultaneously be scanned.

Another configuration for a fingerprint scanner 300 is illustrated in FIG. 4. This embodiment scanner 302 is particularly useful with an embodiment system such as that illustrated in FIG. 2.

This embodiment scanner 300 comprises a clamp 302. The clamp 302 includes generally opposing legs, one of which includes a scanning surface 304. As illustrated, when the clamp 302 is located on a finger, such as the thumb T, the finger is pressed onto the scanning surface 304. An associated fingerprint scanning apparatus reads the fingerprint located on the surface 304.

In another embodiment, the fingerprint scanner may be connected to the player's finger in other manners. For example, the scanner may be connected using an adjustable strap, such as one including hook and loop fastening material which may be wrapped about a player's finger.

The biometric identifier or reader, such as the fingerprint scanners described above, may be configured to provide fingerprint information in a variety of manners. For example, referring to the system 20 illustrated in FIG. 1, the fingerprint scanner may be configured as a USB device, or be connected to the player's computer 28 using a serial or parallel port. The manner by which such a peripheral device may be associated with a computer are well known to those of ordinary skill in the art.

In the case of the system 120 illustrated in FIG. 2, the fingerprint scanner may be connected to the television tuner 32. Alternatively, the fingerprint scanner may associated with the system 120 in other manners.

In any event, the fingerprint scanner is preferably configured to generate fingerprint scan information. This information is provided to the host or casino, such as by transmission to the server, for use in identifying the player, as described in greater detail below.

One embodiment of a method of the invention will now be described with reference to FIG. 5. In accordance with one embodiment of a method, in a first step S1, a file is created. Preferably, this file is used to store information regarding one or more players or potential players. The file may be associated with or stored at a database, such as the database 26,126 of the systems 20,120 described above.

In a step S2, the identity of a player and/or their eligibility to play a game or participate in an event is confirmed. This may comprise, for example, examining identification belonging to the player to ensure the identity of the player and their age.

If the player is eligible to participate in game/event play, then in a step S3, the player's fingerprint is obtained. In one embodiment, this comprises scanning the players's fingerprint. As indicated below, steps S2 and S3 may be performed in person (i.e. not remote) so that appropriate authorities may confirm the identity of the player in person.

In a step S4, an identification code is preferably generated. This code, which may comprise a numeric, text or alpha-numeric code, may be generated by the player or may be assigned to the player. In one embodiment, a password may also be assigned or be selected by the player.

In a step S5, the fingerprint and the identification code/password are stored at the file. In one embodiment, other player information may be stored at the file, such as the player's name, address and age. The fingerprint information may be stored in a variety of forms, such as an image file.

In a step S6, a request is received from a player to play a game. In the case of the system 20 illustrated in FIG. 1, such a request may be initiated by from a remote location, such as by a player using their computer 28. The request may be initiated by the player establishing a dial-in connection over the telephone lines 30, or by accessing a website or the like operated by the host 22 and accessible by the Internet 32 or another network.

In one embodiment, in a step S7, a player provides their identification code and/or password or other identifying information. In one embodiment, the identification code is used to initially identify the player. Using this identification code and/or password, the player's information may be located from the file at the database.

In a step S8, the player's fingerprint is obtained. In one embodiment, this comprises the player causing their fingerprint to be scanned, and the fingerprint information to be transmitted from their location (such as their remotely located computer 28) to the host. For example, in the case of the systems illustrated in FIGS. 1 and 2, the fingerprint information is transmitted to the server.

This fingerprint information is compared to the stored fingerprint information. For example, fingerprint information is compared to the fingerprint information stored in the database. If the fingerprint information matches, then in a step S9, game play is permitted. If the fingerprint information does not match, game play or event participation is not permitted.

It will be appreciated that the various steps of the method need not be performed in the order set forth. It will also be appreciated that other methods may be used to accomplish the object of the invention.

With respect to a system 120 such as that illustrated in FIG. 2, in one embodiment, a player's fingerprint may be obtained when the player checks in at a casino. For example, when player checks in to their room, their fingerprint may be obtained at the front desk. In one embodiment, the fingerprint of each eligible guest is obtained, such as both a husband and wife, but not their minor children. Likewise, other player information may be obtained at that time, and the player's identification codes and/or passwords assigned.

In the case of a system 20 such as that illustrated in FIG. 1, a player's fingerprint and related information may be obtained by having the player "sign up." For example, a player may travel to a casino or a designated location to have their fingerprint taken and their age and other identification confirmed.

In yet another embodiment, a player might be permitted to transmit their fingerprint to the casino or game operator. That fingerprint might be confirmed against an existing, secure database containing the player's fingerprint and identity. For example, a player's identity might be confirmed using FBI or DMV records including the player's fingerprint and identification information.

In accordance with the invention, it is desired that a player's fingerprint be used to verify the identity of the player, and thus entitlement of the player to participate in a gaming event, before the game or event. Thus, the player's fingerprint may simply be obtained before game play.

The player's fingerprint may also be obtained each time the player wishes to play another game. In other words, a player may be required to provide fingerprint information each time they wish to play a game or participate in a betting event.

In one embodiment, the player's fingerprint may be obtained at random intervals, specific intervals and/or upon the occurrence of other events. For example, a player may be required to provide their fingerprint at random times, including during game play.

In one embodiment, a player must continuously provide their fingerprint information or game play or event participation will be terminated. For example, the fingerprint scanner may be configured to continuously read and transmit fingerprint information. The player must continuously permit their fingerprint to be scanned or read and continuously matched in order for game play to continue. In the case of the embodiments illustrated in FIGS. 3 and 4, this means that the player must maintain their thumb T in contact with the scanning surface 204 at all times during game player, or maintain the clamp 302 in place on their finger.

In one embodiment, a signal or prompt may be generated and transmitted to the player at various times. The signal or prompt may request that the player confirm their identity by scanning their fingerprint.

In one embodiment of the invention, a password or other identification code need not be used. In this embodiment, fingerprints of approved or eligible players may be stored. When a player wishes to play a game, their fingerprint information may be scanned against all stored fingerprints and if a match occurs, then eligibility is confirmed. A disadvantage to this method is the length of time which may be necessary to perform comparisons to find a match.

In one embodiment, fingerprints of non-authorized or banned players may be stored. As is known, in some jurisdictions, the identities of players who are banned from engaging in game play are made known to casinos. In accordance with an embodiment of the invention, the fingerprint of those parties may be obtained. Those fingerprints may be transmitted to the casinos or other entities offering games. As part of the method of determining if a player is eligible to play, a player's fingerprint may be compared to a database of fingerprints of ineligible players. In one embodiment, the fingerprint may be compared when a player checks in or seeks to play a game, or at other times.

In one embodiment, fingerprints of other categories of players may be obtained and stored. For example, fingerprints may be obtained from players who do not wish to engage in gaming events or wish to limit their game play. In such event, if the player attempts to participate in a gaming event, the player may be excluded. In another embodiment, when a match of such a fingerprint occurs, secondary criteria may be examined before determining if the player is permitted to play. For example, criteria may be examined to determine how many times a player has participated in gaming events in a period of time. The player may be excluded if the player has exceeded a limit of play events. Criteria may be examined to determine how much money a player has wagered or won or lost participating in gaming events. The player may be excluded if the player has exceeded a value limit.

It will be appreciated that fingerprint information regarding one or more or all of a player's fingers may be used. In a preferred embodiment, information regarding a player's right thumb-print is used. In this regard, it is noted that the term "fingerprint" includes the print of a thumb. The term fingerprint is also intended to include the print of a palm or a portion of the palm or palms of a person, or other parts of the body. The fingerprint may comprise a variety of information. In one embodiment, the print comprises information regarding the topography of the skin. The information may comprise other information, however, including a heat signature or the like.

As indicated, the method includes the use of a biometric identifier. Other biometric identifiers other than the fingerprint may be used. For example, the identifier may be a retinal scan or DNA. In such event, the information obtained and the manner of obtaining the information may vary.

Various systems other than as described above and illustrated in specifically in FIGS. 1 and 2 may be utilized. For example, in one embodiment, a casino may utilize a server to configure and present game information to a player in a room. Storage of player fingerprint information and/or verification of fingerprint information may occur offsite, such as performed by a third party. For example, a central repository of fingerprint information may be collected by a verification entity. Various casinos or gaming operators may gather and send player fingerprint and identification information to this verification entity for storage. At the time it is necessary to verify the identity of a player, the fingerprint information is obtained and the forwarded to the verification entity. If verification occurs, then a message is transmitted to the casino or gaming operator indicating that the player may participate in the game or gaming event.

The method of the invention may also be applied to standard gaming machines on casino floors. For example, in order to ensure the eligibility of a player to play games at such a gaming machine, a fingerprint scanner or other biometric identifying device may be located at or associated with the gaming machine.

The method of the invention may also be applied to stand-alone gaming machines or devices which are located at other than a casino floor. For example, in the future gaming devices may be located in hotel rooms. These gaming devices may be similar to gaming machines currently on casino floors. Once again, a fingerprint scanner may be used to obtain biometric information which is transmitted to a remote location for verification.

The invention has numerous advantages. First and foremost, a reliable means is provided for verifying the identity of a player. In accordance with the invention, this means of identification can not be easily thwarted. For example, the invention prevents a minor from playing a game from a casino/hotel room simply by learning his parents identification code or password. Likewise, the system and method prevent one player who is eligible to play a game from switching places with another player.

The system and method has a number of other security benefits. For example, the system and method can be used to identify players who are not entitled to participate in gaming events because they have been banned by regulatory authorities.

The system and method can also be used to track player activities. For example, a casino or other gaming operator can use the system and method to track a particular player's play.

It will be understood that the above described arrangements of apparatus and the method therefrom are merely illustrative of applications of the principles of this invention and many other embodiments and modifications may be made without departing from the spirit and scope of the invention as defined in the claims.

What is claimed is:

1. A method of identifying a player for determining entitlement of that player to participate in a gaming event that takes place in a room of a hotel having a legal gaming casino therein, the method comprising:
   verifying the identity of a potential player of a gaming event when the player checks in to the hotel and is assigned to the room;
   confirming that the potential player is authorized to participate in a gaming event in the future when the player checks in to the hotel at said legal gaming casino;
   obtaining a fingerprint of said potential player using a first fingerprint scanner located in the hotel;
   generating an identification code for said potential player;
   associating said identification code with said fingerprint;
   storing said fingerprint and identification code from said player on a database that is part of an event host and that is linked to a game server, the database and game server being located in the hotel or casino;
   obtaining a request by a player to participate in a gaming event in the room;
   using said identification code to locate a corresponding stored fingerprint;
   accepting a fingerprint from said player using a second fingerprint scanner located in the room, said second scanner being incorporated into a spring-biased clamp member connected to a tuner linked to a television or monitor used to play said gaming event, the tuner and television or monitor being linked to the database and game server; and
   comparing said fingerprint with said stored fingerprint, whereby if said fingerprint accepted from said player and said stored fingerprint match, said player is verified as entitled to participate in said gaming event played in the room using the tuner, television or monitor and games server.

2. The method in accordance with claim 1 wherein said confirming step includes verifying that the potential player is of sufficient age to participate in a gaming event.

3. The method in accordance with claim 1 including the steps of presenting a gaming event and accepting said fingerprint from said player at one or more times during said gaming event, comparing said fingerprint with said stored fingerprint and permitting continued participation in said gaming event if said accepted fingerprint and said stored fingerprint match.

4. The method in accordance with claim 3 including the step of continuously accepting said fingerprint from said player and comparing said accepted fingerprint with said stored fingerprint.

5. The method in accordance with claim 1 including the steps of creating a database of stored fingerprints of unauthorized players and comparing said accepted fingerprint with said stored fingerprints of unauthorized players and preventing participating in said gaming event if said accepted fingerprint and one of said stored fingerprints of unauthorized players match.

6. The method in accordance with claim 1 including the step of creating a database of stored fingerprints of particular categories of players.

7. The method in accordance with claim 6 wherein at least one of said categories of players comprises a category of players who voluntarily wish to be excluded from participating in gaming events at one or more times.

8. The method in accordance with claim 1 including providing a remote central database and storing said fingerprint and identification code at said database.

9. A method of identifying a player for determining entitlement of that player to participate in a gaming event presented by a a hotel having a legal gaming casino therein to said player located in a room of the hotel assigned to the player comprising the steps of:
   verifying the identity of a potential player of a gaming event when the player checks in to the hotel and is assigned to the room;
   confirming that the potential player is authorized to participate in a gaming event in the future when the player cheeks in to the hotel;
   obtaining biometric information regarding said potential player using a first scanner located in the hotel;
   generating an identification code for said potential player;
   associating said identification code with said biometric information;
   storing said biometric information and identification code at a database on a database that is part of an event host and that is linked to a game server, the database and game server being located in the hotel or casino;
   obtaining a request by a player to participate in a gaming event in the room;
   requesting an identification code from said player;
   obtaining an identification code form said player;
   obtaining biometric information from said player in the room using a second scanner located in the room, said second scanner being connected to a tuner linked to a television or tuner used to play said gaming event in the room, the tuner and television or monitor being linked to the database and game server;
   transmitting said biometric information from the room to the event host;
   comparing said biometric information with biometric information stored at said database which is associated with said obtained identification code; and
   transmitting information permitting said player to participate in said gaming event in the room if said biometric information matches.

10. The method in accordance with claim 9 wherein said confirming step includes verifying that the potential player is of sufficient age to participate in a gaming event.

11. The method in accordance with claim 9 wherein said step of obtaining biometric information regarding said potential player comprises scanning a fingerprint of said player and said step of obtaining biometric information from said player comprises scanning a fingerprint of said player in the room using a scanner incorporated into a spring biased clamp member that connected to the tuner used to play said gaming event.

12. The method in accordance with claim 9 including the step of creating a database of stored fingerprints of particular categories of players.

13. The method in accordance with claim 12 wherein at least one of said categories of players comprises a category of players who voluntarily wish to be excluded from participating in gaming events at one or more times.

14. The method in accordance with claim 12 wherein at least one of said categories of players comprises unauthorized players.

* * * * *

UNITED STATES PATENT AND TRADEMARK OFFICE
CERTIFICATE OF CORRECTION

| | |
|---|---|
| PATENT NO. | : 6,979,264 B2 |
| APPLICATION NO. | : 10/244156 |
| DATED | : December 27, 2005 |
| INVENTOR(S) | : Michelle Chatigny et al. |

Page 1 of 1

It is certified that error appears in the above-identified patent and that said Letters Patent is hereby corrected as shown below:

Column 12
Line 20, "by a a hotel" should be --by a hotel--

Column 12
Lines 27-28, "player cheeks" should be --player checks--

Column 12
Line 42, "code form" should be --code from--.

Signed and Sealed this

Second Day of January, 2007

JON W. DUDAS
*Director of the United States Patent and Trademark Office*